United States Patent Office 3,461,755
Patented Aug. 19, 1969

3,461,755
GLASSCUTTER
Joseph T. Gerew, Gates, and Rudolf Hoeft, Irondequoit,
N.Y., assignors to Paul A. MacInnes Tool Corp.,
Rochester, N.Y., a corporation of New York
Filed Feb. 6, 1967, Ser. No. 614,317
Int. Cl. B26d 3/08
U.S. Cl. 83—12                                            22 Claims

ABSTRACT OF THE DISCLOSURE

There is disclosed a glasscutter comprising a holder member and a separable tool member. The holder member comprises a body having a socket preferably intersected by a linear guide slot with the center line of the socket preferably being in the center plane of the slot. The tool member comprises a carrier conforming in cross section to the socket and insertable in sliding fit into said socket. Extending inwardly from one end of the carrier is a linear wheel slot with part of a glasscutting wheel rotatably disposed in said slot on an axle carried by the carrier. In a preferred embodiment there is in the region of the opposite end of the carrier an outwardly projecting guide pin substantially wider than the cutting wheel, but substantially the same width as the guide slot in the holder member body. The center line of the guide pin is preferably substantially in the center plane of the cutting wheel. The carrier is held in position in the holder member body slot by an inwardly biased ball bearing movably mounted in a transverse bore opening into the socket. Preferably, when lubrication of the cutting wheel and/or axle is desired, the carrier has a lubricant reservoir-passageway which opens into the wheel slot and in which a flowable lubricant is placed.

Background of the invention

In the U.S. Patent No. 2,096,284, to Lee there is disclosed a glasscutter comprising a glasscutting wheel on an axle, a post having a slot in which part of the wheel is disposed, and a removable retainer having an axle holding part and a part seatable in a socket in the post. The retainer specifically disclosed in the Lee patent is a Y-shaped spring, the stem or trunk of which is positioned in the socket of the post and the arms of which, slotted for receiving the axle, are in the post slot and bear against the sides of the slot to frictionally hold the retainer and thereby maintain the axle with the glasscutter wheel in position in the post slot.

While this structure is satisfactory in many circumstances, it has certain disadvantages, especially in glass pattern cutting. One disadvantage, for example, resides in the small axle bearing area or support provided by the retainer. Because of such small area, wear is rapid and wheel life is shortened. Moreover, even with a new wheel and retainer, a desired accuracy in glasscutting may not be obtainable.

An object of this invention is to provide a glasscutter that avoids these disadvantages.

Another object of this invention is to provide a glasscutter that is especially useful in glass pattern cutting.

Still another object of this invention is to provide a generally improved and more satisfactory glasscutter.

Brief description of the drawing

These and other desirable objects may be attained in the manner disclosed as an illustrative embodiment of the invention in the following description and in the accompanying drawing forming a part hereof, in which.

Detailed description of a preferred embodiment

Figure 2:
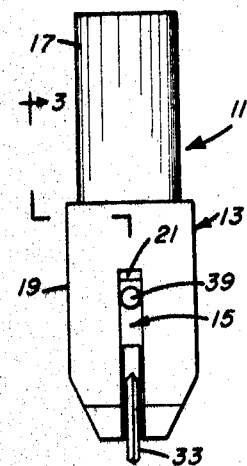
FIG. 2 is a front view of the specific embodiment of FIG. 1.

In greater detail, the drawing illustrates a glasscutter 11 comprising a holder member 13 and a separable tool member 15 (see FIG. 2).

Figure 1:
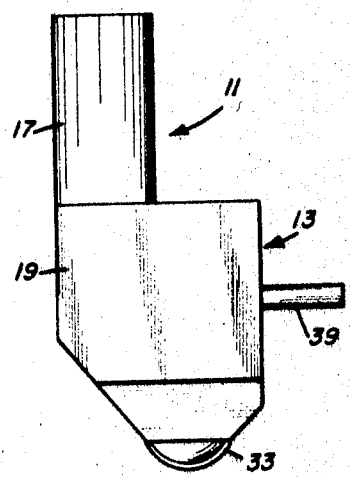
FIG. 1 is a side view of a preferred specific embodiment of a glasscutter of this invention.
Figure 3:
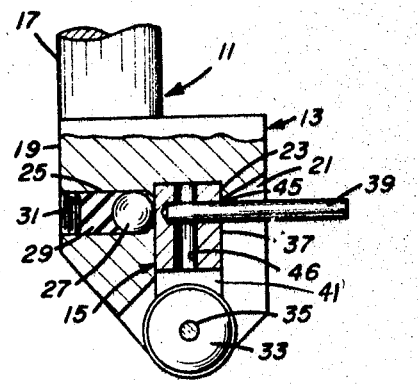
FIG. 3 is a longitudinal sectional view of the construction of FIG. 1, which view has been taken as indicated by the offset sectioning plane 3—3 in FIG. 2.

The holder member 13 shown in FIGS. 1–3 is adapted for use in a conventional glasscutting machine. The holder member 13 comprises a pillar portion 17 which is insertable into a ball bearing type caster mounting (not shown) on the machine. In addition, the holder member comprises a body portion 19. Longitudinally, the body portion has a linear guide slot 21. In this embodiment it is preferred that the sides of the linear guide slot 21 be substantially parallel. Intersecting the guide slot is a cylindrical socket 23 (see FIG. 3). The center line of the socket 23 in the embodiment shown is substantially in the center plane of the slot.

The body portion 19 also comprises a bore 25 (see FIG. 3) transversely disposed relative to the socket 23 and extending from the exterior of the body portion 19 to the cylindrical socket 23. The opening of the bore 25 into the socket 23 is of reduced diameter compared to the remaining portion of the bore 25. Disposed in the bore is a ball bearing 27 with a diameter greater than the diameter of the bore opening into the socket 23, but sufficiently less than the remaining diameter of the bore 25 as to provide a running fit of the ball bearing 27 in the bore 25. Between the ball bearing 27 and the exterior opening of the bore 25 is a resilient element 29 that urges the ball bearing 27 toward the center of the cylindrical socket 23 and yet yields to the ball bearing 27 when the tool member 15 is placed into position in the holder member 13. With the tool member 15 removed from the holder member 13, the ball bearing 27 protrudes into the socket 23, but is prevented from escaping from the bore 25 by the reduced diameter of the opening of the bore at the socket. The resilient element 29 in the embodiment shown is a resilient pad. A suitable material of construction for the pad is neoprene. Other materials are also satisfactory. The outer end of the bore 25 is normally closed by a threaded plug 31. The resilient element 29 abuts the inner end of the threaded plug 31. By turning the threaded plug further into the bore 25 the bias on the ball bearing 27 is increased, while turning the threaded plug 31 outwardly from the bore 25 decreases the bias which the resilient element 29 brings to bear on the ball bearing. In some embodiments, the bias of the resilient element 29 is adjusted at the time of the assembly of the holder member 13, and the exterior end of the plug 31 is made even with the surrounding exterior of the carrier body portion 19. In other embodiments, the outer end of the threaded plug 31 is adapted, as by a slot, polygonal socket or Philips screwhead socket configuration, to permit adjustment of the bias from time to time as desired under actual use conditions.

Figure 4:
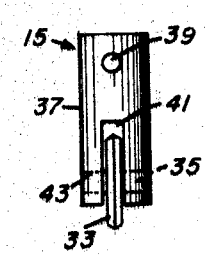
FIG. 4 is a front view of the separable tool member of the glasscutter of FIG. 1.
Figure 5:
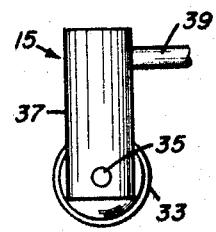
FIG. 5 is a side view of the tool member of FIG. 4.

The tool member 15 comprises a glasscutting wheel 33, an axle 35 (see FIGS. 3–5), a carrier 37 and an alinement pin 39. The glasscutting wheel 33 is of conventional structure and the axle 35 is conventional. The cutting wheel 33 is mounted on the axle 35. It can be secured to the axle. Preferably, however, it is rotatable relative to the axle. The carrier 37 comprises a cylindrical body insertable in sliding fit into the socket 23 in the holder body portion 19. The cylindrical body of the carrier comprises a linear wheel slot 41 (see FIG. 4) the center plane of which substantially intersects the center line of the cylindrical body. The two sides of the wheel slot 41 preferably are substantially parallel. The wheel slot 41 not only extends diametrically (see FIG. 3), but also longitudinally to one end of the cylindrical body of the carrier 37. At a distance from this end substantially less than the maximum radius of the cutter wheel 33, the cylindrical body of the carrier 37 has on a diameter substantially at right angles to the center plane of the wheel slot 41 an axle hole 43 (see FIG. 4) which is open at both ends. The cutter wheel 33 is normally positioned in the wheel slot 41 with a portion thereof extending outwardly from the end of the carrier 37 and with the axle 35 disposed, preferably in running fit, in the axle hole 43 on each side of the wheel slot 41. The alinement pin 39 is a cylindrical pin, the center line of which is preferably substantially in the center plane of the wheel slot 41. The alinement pin is seated in press fit in a bore 45 (see FIG. 3) in the upper portion of the cylindrical body of the carrier 37, and projects outwardly therefrom. Preferably, the diameter of the alinement pin 39 is just sufficiently less than the width of the guide slot 21 in the holder body portion 19 that it can be slidably disposed therein when inserting the tool member 15 into the holder member 13. The width of the guide slot 21 is substantially greater than the maximum width of the cutter wheel 33.

On the other hand, the width of the wheel slot 41 in the cylindrical body of the carrier 37 is preferably just enough to accommodate in sliding fit the cutter wheel 33. Indeed, it is preferred that it be just enough so that a lubricant must be applied to the sides of the cutter wheel 33 to enable the cutter wheel 33 to turn freely under normal operative conditions. Actually the embodiment shown in the drawing is constructed this way, but for clarity spacing is shown between the sides of the cutter wheel 33 and the sides of the wheel slot 41.

Also, it is preferred that the diameter of the axle hole 43 on each side of the wheel slot 41 and the diameter of the axle 35 extending outwardly from each side of the cutter wheel 33 be such that the axle fits the axle hole so closely that lubrication must be applied to enable the axle 35 to turn freely under normal operative conditions.

A major reason for such close fit is to maximize cutter wheel and carrier lives while establishing and maintaining highly precise and accurate cutting by the wheel during its cutting life.

When it is desired to apply lubricant to the cutting wheel sides, to the axle or to both the cutting wheel sides and axle, the cylindrical body of the carrier 37 preferably has a lubricant reservoir and passageway 46 (see FIG. 3) leading from the unslotted end, the top end in the drawing, to the wheel slot 41. Preferably the reservoir passageway is on the longitudinal center line of the carrier 37. Prior to inserting the tool member 15 into the holder member 13, a flowable lubricant is introduced into the reservoir-passageway 46. The lubricant preferably is one that runs out of the passageway 46 very slowly, indeed preferably at a rate at which it is desired to be applied to the cutter wheel sides, to the axle, or to both the sides and axle. Lubricating oil, graphite suspension, and the like are examples of such a lubricant. Of course, when the alinement pin 39 extends through the center of the cylindrical body of the carrier 37, the cross section of the reservoir passageway 46 at the outside diameter or maximum cross section of the alinement pin must be sufficiently large to enable lubricant to flow around the alinement pin, as shown in FIG. 3.

The glasscutter 11 is assembled by inserting the carrier 37 as far as it will go into the socket 23 in the holder body 19 with the alinement pin 39 placed in the guide slot 21. The engagement of the ball bearing 27 with the cylindrical body of the carrier 37 is sufficient under normal conditions to maintain the tool member 15 in position. When the carrier 37 is in position in the socket 23, the axle hole 43 at each end preferably is covered by the corresponding side of the guide solt 21. This is of advantage in retaining the axle 35 in place when it is slidable in the axle hole 43 and the cutting wheel 33 is rotatable relative to the axle.

To disassemble the glasscutter 11, a separating force is applied preferably by a finger to the alinement pin 39 and the carrier 37 is thereby pushed out of engagement with the ball bearing 27 and out of the socket 23. In this connection, it is preferred that the bias of the resilient element 29 on the ball bearing 27 be adjusted by the threaded plug 31 so as to enable the carrier 37 to be maintained in place in the socket 23 under normal operative conditions, and yet be removed therefrom by a desired amount of finger pressure.

Although the tool member 15 has been described relative to a holder 13 adapted for use in a glass cutting machine, the tool member 15 is not limited thereto. It can be in combination with a holder associated with a hand cutter.

Thus, there is provided a glasscutter that is inherently rugged, has long life even under severe use conditions, and can be used to obtain highly precise and accurate cutting of glass. Yet, in preferred embodiments of this invention the tool member can be manually removed from the holder member without the use of a tool. Moreover, the structural concepts of this invention are applicable to a wide variety of sizes and shapes of holder members and tool members of this invention.

It is seen from the foregoing disclosure that the purposes of the invention are well fulfilled. It is to be understood that the disclosure is given by way of illustrative example only, rather than by way of limitation, and without departing from the invention.

What is claimed is:

1. A glasscutter comprising a holder member and a separable tool member, said holder member having a body portion with a linear socket, said tool member comprising a substantially rigid carrier body at least a portion of which is disposed in sliding fit in said socket and occupies substantially all of the space of said socket, said carrier body having a linear wheel slot extending to the outer end of said carrier with an axle receiving linear hole intersecting said wheel slot at substantially right angles to the center plane of said wheel slot, an axle disposed in said axle receiving hole, and a glasscutting wheel on said axle and in said wheel slot with a substantial portion of said wheel extending outwardly from said end of said carrier body, wherein said holder member body portion comprises a bore transversely disposed relative to the center line of said linear socket and opening into said socket, the diameter of the opening of said bore into said socket being substantially less than the diameter of said bore, and said holding means comprise a ball bearing slidably disposed in said bore, said ball bearing having a diameter substantially greater than said diameter of said bore opening, and resilient means urging said ball bearing toward the center of said socket.

2. A glasscutter according to claim 1, wherein said resilient means comprise a resilient pad disposed in said bore on the outer side of said ball bearing.

3. A glasscutter according to claim 2, wherein said holding means further comprise a plug in the outer portion of said bore and in threaded engagement therewith for maintaining said resilient pad against said ball bearing and for adjusting the bias of said pad on said ball bearing.

4. A glasscutter comprising a holder member and a separable tool member, said holder member having a body portion with a linear socket, said tool member comprising a substantially rigid carrier body at least a portion of which is disposed in sliding fit in said socket and occupies substantially all of the space of said socket, said carrier body having a linear wheel slot extending to the outer end of said carrier with an axle receiving linear hole intersecting said wheel slot at substantially right angles to the center plane of said wheel slot, an axle disposed in said axle receiving hole, and a glasscutting wheel on said axle and in said wheel slot with a substantial portion of said wheel extending outwardly from said end of said carrier body, wherein said holder member body portion comprises a linear guide slot opening into said socket from the outer end of said socket to at least an inner portion of said socket with the center plane of said slot being at least substantially parallel to the center line of said socket, and said tool member comprises an alinement pin extending laterally from said carrier body and disposed in sliding fit in said linear guide slot.

5. A glasscutter according to claim 4, wherein the center line of said socket is substantially in the center plane of said linear guide slot and said alinement pin is substantially straight with the center line thereof substantially in the center plane of said wheel, and in cross section perpendicular to said center plane of said wheel substantially larger than the maximum corresponding cross section of said wheel.

6. A glasscutter according to claim 5, wherein the two sides of said linear guide slot are substantially parallel.

7. A glasscutter according to claim 5, wherein a substantial portion of said cutter wheel extends outwardly from said linear guide slot.

8. A glasscutter according to claim 7, wherein the outer ends of said axle hole are covered by the two sides of said linear guide slot.

9. A glasscutter according to claim 5, wherein said alinement pin extends outwardly from said linear guide slot sufficiently to be engaged substantially by a finger.

10. A tool for a glasscutter having a holder member body portion with a linear socket, which comprises: a substantially rigid carrier body at least a portion of which is insertable into said socket and occupies substantially all of the space of said socket, said carrier body having a linear wheel slot extending to the normally outer end of said carrier with an axle receiving linear hole intersecting said wheel slot at substantially right angles to the center plane of said wheel slot, an axle disposed in said axle receiving hole, and a glasscutting wheel on said axle and in said wheel slot with a substantial portion of said wheel extending outwardly from said end of said carrier body, wherein said holder member body portion further comprises a linear guide slot opening into said socket from the outer end of said socket to at least an inner portion of said socket with the center plane of said socket being at least substantially parallel to the center line of said socket, said tool further comprising an alinement pin extending laterally from said carrier body and insertable in sliding fit into said linear guide slot.

11. A tool according to claim 10, for said glasscutter wherein the center line of said socket is substiantially in the center plane of said linear guide slot, said alinement pin being substantially straight with the center line thereof substantially in the center plane of said wheel, and in cross section perpendicular to said center plane of said wheel being substantially larger than the maximum corresponding cross section of said wheel.

12. A tool according to claim 11, wherein said carrier body comprises a lubricant reservoir in communication with said wheel slot.

13. A tool according to claim 12, wherein said carrier body is cylindrical, the center plane of said wheel slot is substantially on a diameter of said body, the two sides of said wheel slot are substantially parallel, said cutter wheel is disposed between said two sides in sliding fit, and said lubricant reservoir is a center longitudinal passageway extending to said wheel slot from the normally inner end of said carrier body.

14. A holder for a tool having a substantially rigid carrier, at least a portion of which is insertable in sliding fit into a socket and occupies substantially all of the space of said socket, and which has an alinement pin extending laterally from said carrier, which comprises a body portion with a linear socket and a linear guide slot for receiving in sliding fit said alinement pin, said linear guide slot opening into said socket from the outer end of said socket to at least an inner portion of said socket with the center plane of said slot being at least substantially parallel to the center line of said socket.

15. A holder according to claim 14, wherein the center line of said socket is substantially in the center plane of said linear guide slot and the two sides of said linear guide slot are substantially parallel.

16. A holder according to claim 15, which comprises in addition a pillar portion insertable into a ball bearing type caster mounting, and said tool is a glasscutter tool.

17. A glasscutter comprising a holder member and a tool member separable therefrom; said holder member comprising a block having a shank projecting from one end of the block and a bore extending into said block from the opposite end thereof, said shank having a central longitudinal axis and said bore having a central longitudinal axis substantially parallel to and offset laterally to a substantial extent from the longitudinal axis of said shank; said tool member comprising a carrier movable longitudinally into and out of said bore and filling substantially the entire cross sectional area of said bore and having a snug sliding fit within said bore, said carrier having a central longitudinal wheel slot extending from the outer end of said carrier to a portion of the carrier which is within said block when said carrier is in normal mounted position in said block, a glasscutting wheel rotatably mounted in said wheel slot, and mounting means for said wheel including an axle passing laterally through lateral axle openings in said carrier and through the center of said wheel in said wheel slot.

18. A construction as defined in claim 17, wherein said block has a guide slot extending from said opposite end of said block toward the shank end thereof, said slot opening at one edge into said bore and opening at an opposite edge to an outside surface of said block, said carrier having an alinement pin extending laterally from said carrier through said guide slot to an externally accessible position, said pin serving as readily accessible means for moving said carrier longitudinally out of said bore and also as means for preventing rotation of said carrier within said bore.

19. A construction as defined in claim 18, wherein said block contains resilient means pressing laterally against said carrier in said bore to hold said carirer frictionally against accidental longitudinal displacement from said bore.

20. A construction as defined in claim 19, wherein said carrier is unrestrained against longitudinal movement out of said bore except frictionally, so that it may be quickly and easily removed from said bore and replaced by another similar carrier with a fresh cutting wheel.

21. A construction as defined in claim 17, wherein said axle openings in said carrier are positioned within said block when said carrier is in normal mounted position within said block, so that portions of said block surrounding said carrier will retain said axle against displacement in a direction longitudinally of its own axis and laterally of the axis of said bore.

22. A construction as defined in claim 17, wherein said carrier has a longitudinally extending oil reservoir recess communicating with said wheel slot.

References Cited

UNITED STATES PATENTS

| | | | |
|---|---|---|---|
| 820,092 | 5/1906 | Brown | 30—164 |
| 2,382,267 | 8/1945 | Stellin | 83—698 X |
| 2,707,849 | 5/1955 | DeVore | 30—164 |
| 3,106,122 | 10/1963 | Newcomb | 83—698 |
| 3,160,043 | 12/1964 | Judd | 30—164.95 X |
| 3,245,694 | 4/1966 | Parker | 83—698 X |
| 3,373,488 | 3/1968 | Fletcher | 30—164 |
| 3,392,445 | 7/1968 | Koran et al. | 30—164 |

FOREIGN PATENTS

| | | |
|---|---|---|
| 1,112,310 | 11/1955 | France. |
| 1,145,562 | 5/1957 | France. |

FRANK T. YOST, Primary Examiner

U.S. Cl. X.R.

30—164.95; 83—169, 481, 676, 698